Patented July 11, 1950

2,514,505

UNITED STATES PATENT OFFICE 2,514,505

RESINOUS CONDENSATION PRODUCTS OF UREA, ALKYL UREA, FORMALDEHYDE, AND POLYHYDRIC ALCOHOL OR DERIVATIVE THEREOF

Paul D. Morton, Riverview, Mich., assignor to Sharples Chemicals Inc., a corporation of Delaware No Drawing. Application June 30, 1945, Serial No. 602,654

16 Claims. (Cl. 260—70)

The present invention pertains to the art of synthetic resinous condensation products, and to the manufacture of such products by condensing urea and urea derivatives with formaldehyde or its equivalents. By the practice of the invention, there are obtained condensation products of consistency varying from liquid to plastic solid. Particularly desirable condensation products of the invention are those of viscous liquid consistency. By the practice of the invention, products of this type may be obtained which are very unusual in that they exhibit little change in viscosity even under the influence of considerable changes in temperature.

It is possible, in practice of the invention, to make condensation products that are adhesive, insoluble in water or aromatic hydrocarbons or both, non-corrosive to metals, and of great chemical stability and considerable shear strength. These properties render them valuable for a number of uses. They are useful, for example, as lubricants for valves designed to operate under considerable temperature differences, and as vehicles for coating materials to be applied to metal and other surfaces.

The basic feature of the invention consists in the fact that it involves co-condensation of urea, and alkyl urea, formaldehyde and a polyhydric alcohol or derivative thereof. The preferred polyhydric alcohol is glycerine, but other compounds of this type, such as ethylene glycol, butylene glycol, propylene glycol, triethylene glycol, ethylene glycol monoethyl ether, methyl glycerate and methyl glycollate may be substituted for the glycerine in the reaction.

In order to facilitate an understanding of the invention, it will first be described in reference to a preferred procedure for forming the resinous condensation products, and then discussed in relation to certain variants which may be adopted to produce specific modifications in the character of the resinous condensation product.

The preferred urea constituents for use in practice of the invention are urea and butyl urea, and resinous condensation products which are insoluble in water and hydrocarbons and have all of the other desirable properties discussed above have been produced by condensation with formaldehyde and glycerine of mixtures containing a weight ratio of urea to butyl urea of approximately 3:7. This may best be accomplished by introducing an aqueous formaldehyde solution containing 37% formaldehyde into contact with glycerine and a small quantity of catalyst in a reaction vessel. Although an amount of formaldehyde as high as a molar ratio of 4:1 relative to urea constituents may be used, a molar ratio of between 2:1 and 2.5:1 is preferred. The glycerine may be present in a molar ratio of between ½:1 and 4:1 (preferably between 1:1 and 1.5:1) with respect to such urea constituents. The preferred catalyst is glacial acetic acid, but other acid and basic catalysts which have heretofore been used in condensation of urea and its derivatives with formaldehyde may be employed. The formaldehyde, glycerine and catalyst are heated together while stirring until the temperature reaches the boiling point, and then the mixture of urea and butyl urea is added in increments, care being taken to obtain a clear solution after each increment before the subsequent one is added. After all of the urea constituents to be condensed with the formaldehyde and glycerine have been added to the reaction mixture, heating is continued until the temperature of the reaction mixture rises to a point indicating that all of the water has been removed (125–150° C.). The condensation produce will be found to be clear, viscous and water white, it being plastic and tacky, and insoluble both in aromatic hydrocarbons and in water. It is non-corrosive to copper and brass, and abrupt changes in temperature between the temperature of —40° F. and +180° F. have very little effect upon its viscosity. This combination of unusual characteristics renders the product admirably suited as a lubricant for 100 octane gasoline cocks on air craft. Due to the insoluble tacky nature of the product, it may also be pigmented and applied as a lining to bullet-proof gasoline tanks, or in other coating applications. In this connection, it should be pointed out that this product adheres excellently to brass, copper, aluminum and glass, and may be spread into thin, even, films upon such surfaces under pressure. These films stand up excellently under immersion tests in xylene, toluene and high test gasoline. Panels which have been coated with the product and exposed to the atmosphere for sixty days at room temperature still remained soft and tacky. A brass valve cock greased with the product remained movable at 0° F. and did not exude the product even at 150° F.

While the above ratios of constituents and method of preparation have been found best from the standpoint of manufacture of the particular product discussed above, considerable variations may be made as to ratio of urea constituents to each other, ratio of glycerine to urea constituents, and as to the nature of the alkyl urea employed in practice of the invention. Thus, while the use of mono-butyl urea is preferred, other mono-alkyl ureas containing between 3 and 8 carbon atoms in the alkyl radical may be substituted for the butyl urea, and the invention includes within its broad scope the combination of urea with any alkyl urea or dialkyl urea containing from one to twelve carbon atoms in the alkyl substituents or the sum of the alkyl substituents for condensation with formaldehyde and the polyhydric alcohol or derivative thereof. While the preferred weight ratio of butyl urea (or other mono-alkyl urea containing between 3 and 8 alkyl carbon atoms) to simple urea is approximately 7:3, the advantages of practice of the invention may be achieved in varying measure, depending on the type of product desired, by use of any ratio of urea to alkyl urea. Thus, for example, weight ratios of any of the above-discussed alkyl ureas to simple urea varying between 9:1 and 1:9 may be used, while very favorable results in obtaining a viscous liquid product may be attained within a weight ratio range of urea to alkyl urea between 1:4 and 1:1. As noted above, the molecular ration of glycerine or other polyhydric alcohol or derivative thereof to urea constituents should be between 1:1 and 1.5:1 for optimum results along the line of those discussed above, but here again, this ratio may vary between ½:1 and 4:1.

In general, it may be said that an increase in the ratio of simple urea to alkyl urea gives a more viscous resinous condensation product, high proportions of simple urea giving solid products, which are softer than would be the case if the alkyl urea were eliminated. Higher carbon content of the alkyl substituent or substituents, and higher ratios of the substituted ureas to the unsubstituted urea, tend to give products of lower viscosity, and of greater solubility in aromatic hydrocarbons. Higher ratios of glycerine (or other polyhydric alcohol) to urea constituents also tend to give products of lower viscosity, which have less tendency to be soluble in aromatic hydrocarbons and more tendency to be soluble in water, than corresponding products containing less glycerine. In short, the possibility of adjustments in the nature and proportions of urea constituents and the ratio of polyhydric alcohol to such constituents provides a wide range of control of the properties of the condensation products obtained therefrom. For example, a typical resinous condensation product formed from urea and butyl urea has been found to have a viscosity of 1000 centipoises at 56° C., while a similar resin formulated with 70% urea had a viscosity of 17,600 centipoises at 63° C.

Although the invention has been described above in terms of addition of the glycerine before the start of the reaction, it may be introduced after the urea constituents have reacted partially with the formaldehyde, so long as care is taken to have the glycerine present before gelation occurs.

The dehydration of the reaction mixture may be assisted, in practice of the invention, by introducing an entraining liquid to assist in removal of the water, or by application of vacuum to the reaction mixture.

In cases in which the reaction product formed in practice of the invention does not have sufficient viscosity or shear strength, it is recommended that there be added to this product a calcium soap of blown castor oil.

The following examples illustrate the practice of the invention:

Example I 168.5 parts of aqueous formaldehyde (37%), 165 parts of glycerine and 0.5 part of glacial acetic acid were added to a reaction vessel and heated while stirring until the temperature reached 90° C. A mixture of butyl urea and urea containing approximately 70% of butyl urea by weight and 30% of urea was charged in small quantities, the addition of the urea constituents being accomplished in increments in such manner as to yield a clear solution between successive increments of addition. After 100 parts of the urea constituents had been added, the mixture was heated until the temperature reached 135° C. The resultant product was found to be viscous, clear, stable and non-drying.

Example II 180 parts of aqueous formaldehyde, 200 parts of glycerine and 0.5 part of acetic acid were heated together to 90° C. and 100 parts of a mixture of urea and butyl urea were added and reacted as in Example I. The reaction mixture was then heated to a temperature of 150° C. The product was similar to that of Example I, except that it was somewhat less viscous.

Example III 181 parts of aqueous formaldehyde, 165 parts of ethylene glycol and 0.5 part of glacial acetic acid were reacted with 100 parts of a mixture of urea and butyl urea as in Example I. The product had all of the advantageous characteristics of that of Example I except that it was somewhat less viscous.

Example IV 181 parts of formaldehyde, 120 parts of glycerine, 45 parts of ethylene glycol, 0.5 part of acetic acid and 100 parts of the urea-butyl urea mixture of Example I were processed as described in Example I. The product was found to be less viscous than that of Example I, but more viscous than that of Example III. Otherwise, it was similar to the products of the preceding examples.

Example V

In accordance with the procedure of Example I, 46 grams of glycerine, 54 grams of aqueous formaldehyde, 0.5 gram of glacial acetic acid, and 32 grams of a mixture of mono-ethyl urea and simple urea containing 41.6% of the latter by weight were reacted, initial and final temperatures of 85° C. and 150° C. respectively being used. A clear, almost water-white condensation product was obtained which was soluble in water and methanol but insoluble in xylene and toluene. The viscosity of this material at 56° C. was about 5000 centipoises.

Example VI

Using a technique similar to that described in Example I, 46 grams of glycerine, 5.4 grams of aqueous formaldehyde, 0.5 gram of glacial acetic acid and a mixture of 32 grams of mono-ethyl urea and simple urea containing only 6% of the latter by weight were reacted, initial and final temperatures of 80° C. and 150° C. being used. The resinous material so obtained was clear, almost water-white, and had a viscosity of about 900 centipoises at 56° C.

Example VII

After the manner of Example I, 46 grams of glycerine, 83 grams of aqueous formaldehyde, 0.5 gram of glacial acetic acid, and a mixture containing 22.2 grams of simple urea together with 9.8 grams of mono-ethyl urea were condensed together. The resulting product was clear, almost water-white, and had a viscosity of about 17,000 centipoises at 63° C. It was soluble in methanol and water but insoluble in xylene and toluene.

Comparative Example VIII

In a manner similar to that of Example I, 46 grams of glycerine, 54 grams of aqueous formaldehyde, 0.5 gram of glacial acetic acid, and 32 grams of unsymmetrical diethyl urea were condensed together. The resulting product separated into two layers. The top layer was dark colored and consisted largely of the condensation product of the diethyl urea and formaldehyde, whereas the bottom layer was light in color and comprised the reaction product of the glycerine and formaldehyde. This example illustrates the necessity of having some simple urea present in the case of certain di-substituted ureas in order that the glycerine will actually be incorporated into a homogeneous reacted product.

Example IX

After the fashion of Example I, 46 grams of glycerine, 54 grams of aqueous formaldehyde, 0.5 gram of glacial acetic acid, and a mixture of 22.4 grams of unsymmetrical dibutyl urea and 9.6 grams of simple urea were condensed together. The resulting product was soluble in water and methanol and insoluble in xylene although it was somewhat softened by the latter solvent. The viscosity at 53° C. was about 2100 centipoises.

Example X

Using a technique similar to that described in Example I, 46 grams of glycerine, 54 grams of aqueous formaldehyde, 0.5 gram of glacial acetic acid, and a mixture of 22.4 grams of butyl thiourea and 9.6 grams of simple urea were reacted together. The resulting resin had excellent water resistance and was insoluble in xylene and toluene. It had a light straw color and a viscosity of about 2700 centipoises at 57° C.

Example XI

After the fashion of Example I, 46 grams of glycerine, 54 grams of aqueous formaldehyde, 0.5 gram of glacial acetic acid and a mixture of 19 grams of butyl thiourea and 13 grams of simple urea were condensed together. The resulting product was sparingly soluble in water and methanol but insoluble in toluene and xylene.

Example XII

In accordance with the technique of Example I, 46 grams of glycerine, 54 grams of aqueous formaldehyde, 0.5 gram of glacial acetic acid, and a mixture of 22.4 grams of hexyl thiourea and 9.6 grams of simple urea were condensed together. The resulting product was sparingly soluble in water and methanol, insoluble in xylene and toluene, and had a viscosity of about 5400 centipoises at 57° C.

Various modifications are available to those skilled in the art, and I do not therefore wish to be limited except by the scope of the following claims.

I claim:

1. The process of forming a resinous condensation product which comprises combining together urea, an alkyl urea chosen from the class consisting of mono- and di-alkyl ureas containing from 1 to 12 alkyl substituent carbon atoms, aqueous formaldehyde and a compound chosen from the class of polyhydric alcohols and derivatives thereof consisting of glycerine, ethylene glycol, butylene glycol, propylene glycol, tri-ethylene glycol, ethylene glycol monoethyl ether, methyl glycerate and methyl glycollate, and heating to form the desired resinous condensation product, the weight ratio of urea to alkyl urea being between 1:4 and 1:1, the molecular ratio of the compound chosen from the class of polyhydric alcohols and derivatives thereof to urea constituents being between ½:1 and 4:1 and the molecular ratio of formaldehyde to urea constituents being between 2:1 and 4:1.

2. The process of forming a resinous condensation product which comprises combining together urea, and alkyl urea chosen from the class consisting of mono- and di-alkyl ureas containing from 1 to 12 alkyl substituent carbon atoms, aqueous formaldehyde and a compound chosen from the class of polyhydric alcohols and derivatives thereof consisting of glycerine, ethylene glycol, butylene glycol, propylene glycol, tri-ethylene glycol, ethylene glycol monoethyl ether, methyl glycerate and methyl glycollate, and heating in the presence of an acid catalyst to form the desired resinous condensation product, the weight ratio of urea to alkyl urea being between 1:4 and 1:1, the molecular ratio of the compound chosen from the class of polyhydric alcohols and derivatives thereof to urea constituents being between ½:1 and 4:1 and the molecular ratio of formaldehyde to urea constituents being between 2:1 and 4:1.

3. The process of forming a resinous condensation product which comprises combining together urea, a mono-alkyl urea containing between 3 and 8 carbon atoms in the alkyl radical, aqueous formaldehyde and a compound chosen from the class of polyhydric alcohols and derivatives thereof consisting of glycerine, ethylene glycol, butylene glycol, propylene glycol, triethylene glycol, ethylene glycol monoethyl ether, methyl glycerate and methyl glycollate, and heating in the presence of a catalyst consisting of glacial acetic acid to form the desired resinous condensation product, the weight ratio of urea to alkyl urea being between 1:4 and 1:1, the molecular ratio of the compound chosen from the class of polyhydric alcohols and derivatives thereof to urea constituents being between ½:1 and 4:1 and the molecular ratio formaldehyde to urea constituents being between 2:1 and 4:1.

4. The process of forming a resinous condensation product which comprises combining together urea, a monoalkyl urea containing between 3 and 8 carbon atoms in the alkyl radical, aqueous formaldehyde and a compound chosen from the class of polyhydric alcohols and derivatives thereof consisting of glycerine, ethylene glycol, butylene glycol, propylene glycol, tri-ethylene glycol, ethylene glycol monoethyl ether, methyl glycerate and methyl glycollate, and heating to form the desired resinous condensation product the weight ratio of urea to alkyl urea being between 9:1 and 1:9, the molecular ratio of the compound chosen from the class of polyhydric alcohols and derivatives thereof to urea constituents being between ½:1 and 4:1 and the molecular ratio of formaldehyde to urea constituents being between 2:1 and 4:1.

5. The process of forming a resinous condensation product which comprises combining together urea, a monoalkyl urea containing between 3 and 8 carbon atoms in the alkyl radical, aqueous formaldehyde and a compound chosen from the class of polyhydric alcohols and derivatives thereof consisting of glycerine, ethylene glycol, butylene glycol, propylene glycol, triethylene glycol, ethylene glycol monoethyl ether, methyl glycerate and methyl glycollate, and heating to form the desired resinous condensation product the weight ratio of urea to alkyl urea being between 1:4 and 1:1, the molecular ratio of the compound chosen from the class of polyhydric alcohols and derivatives thereof to urea constituents being between 1:1 and 1.5:1, and the molecular ratio of formaldehyde to urea constituents being between 2:1 and 4:1.

6. The process of forming a resinous condensation product which comprises combining together urea, a mono-alkyl urea containing between 3 and 8 carbon atoms in the alkyl radical, glycerine and aqueous formaldehyde, and heating to form the desired resinous condensation product the weight ratio of urea to alkyl urea being between 1:4 and 1:1, the molecular ratio of glycerine to urea constituents being between 1:1 and 1.5:1, and the molecular ratio of formaldehyde to urea constituents being between 2:1 and 4:1.

7. The process of forming a resinous condensation product which comprises combining together urea, mono-butyl urea, glycerine and aqueous formaldehyde and heating to form the desired resinous condensation product, the weight ratio of urea to mono-butyl urea being between 1:4 and 1:1, the molecular ratio of glycerine to urea constituents being between ½:1 and 4:1, and the molecular ratio of formaldehyde to urea constituents being between 2:1 and 4:1.

8. The process of forming a resinous condensation product which comprises condensing together urea, mono-butyl urea, aqueous formaldehyde and a compound chosen from the class of polyhydric alcohols and derivatives thereof consisting of glycerine, ethylene glycol, butylene glycol, propylene glycol, triethylene glycol, ethylene glycol monoethyl ether, methyl glycerate and methyl glycollate, and heating to form the desired resinous condensation product, the weight ratio of urea to mono-butyl urea being between 1:4 and 1:1, the molecular ratio of the compound chosen from the class of polyhydric alcohols and derivatives thereof to urea constituents being between ½:1 and 4:1 and the molecular ratio of formaldehyde to urea constituents being between 2:1 and 4:1.

9. The process of forming a resinous condensation product which comprises combining together urea, mono-butyl urea, aqueous formaldehyde and a compound chosen from the class of polyhydric alcohols and derivatives thereof consisting of glycerine, ethylene glycol, butylene glycol, propylene glycol, triethylene glycol, ethylene glycol monoethyl ether, methyl glycerate and methyl glycollate, and heating to form the desired resinous condensation product the weight ratio of urea to alkyl urea being between 1:4 and 1:1, the molecular ratio of the compound chosen from the class of polyhydric alcohols and derivatives thereof to urea constituents being between 1:1 and 1.5:1, and the molecular ratio of formaldehyde to urea constituents being between 2:1 and 4:1.

10. As a new article of manufacture, a resinous condensation product formed in accordance with claim 1.

11. As a new article of manufacture, a resinous condensation product formed in accordance with claim 4.

12. As a new article of manufacture, a resinous condensation product formed in accordance with claim 9.

13. The process of forming a viscous resinous condensation product substantially insoluble in water and hydrocarbons which comprises combining urea, a monoalkylurea containing from 3 to 8 carbon atoms in the alkyl radical, aqueous formaldehyde and glycerine and heating the resulting mixture in the presence of a catalyst for the condensation of ureas with formaldehyde until the desired condensation product is formed, the weight ratio of the urea to the alkyl urea employed being between 1:4 and 1:1, the molecular ratio of formaldehyde to the totality of the urea constituents being between 2:1 and 4:1, and the molecular ratio of the glycerine to the totality of the urea constituents being between 0.5:1 and 4:1.

14. The process of claim 13 in which the condensation is conducted in the presence of acetic acid.

15. The process of claim 13 in which water is eliminated by vaporization from the reaction mass during the condensation to provide a substantially anhydrous product.

16. As a new article of manufacture, a viscous resinous condensation product formed in accordance with the process of claim 13.

PAUL D. MORTON.

REFERENCES CITED

The following references are of record in the file of this patent:

UNITED STATES PATENTS

| Number | Name | Date |
|---|---|---|
| 1,633,337 | Lauter | June 21, 1927 |
| 2,273,788 | Olin | Feb. 17, 1942 |
| 2,278,374 | Olin | Mar. 31, 1942 |
| 2,278,375 | Olin | Mar. 31, 1942 |
| 2,403,450 | Morton et al. | July 9, 1946 |

FOREIGN PATENTS

| Number | Country | Date |
|---|---|---|
| 545,081 | Great Britain | May 11, 1942 |